March 4, 1941.   P. E. COMI   2,233,771
MOTION PICTURE MACHINE
Filed Aug. 2, 1938
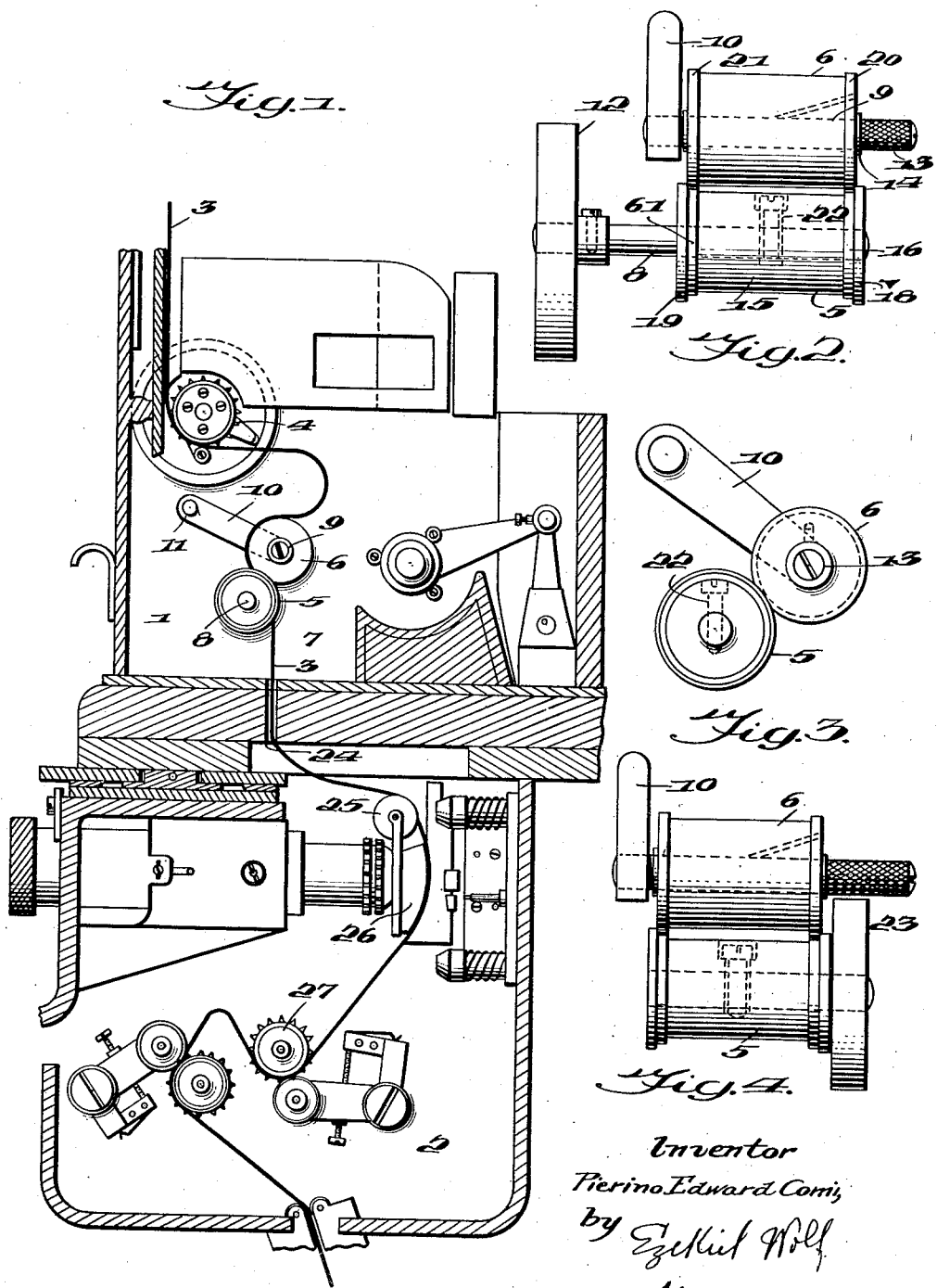
Inventor
Pierino Edward Comi,
by Ezekiel Wolf
Attorney Patented Mar. 4, 1941

2,233,771

UNITED STATES PATENT OFFICE 2,233,771

MOTION PICTURE MACHINE

Pierino Edward Comi, Wollaston, Mass.

Application August 2, 1938, Serial No. 222,691

7 Claims. (Cl. 271—2.3)

The present invention relates to motion picture machines in which the film for projecting the picture also has the sound track for providing the sound reproduction.

In the usual motion picture projector, the film is stopped at the instant that it is projected on the screen and it is not moved from its projecting position until the shutter has first covered the picture. The movement of the film is therefore a continued series of short rapid motions which usually is accomplished by the use of a so called Geneva movement in that part of the motion picture projector where the picture frames are successively projected on the screen.

In motion projection cameras the film is wound at a substantially constant velocity there being provided a sufficient amount of slack in the film so that the start and stop movement during the projection of the frames need not interfere with the constant velocity of the film itself. After the film has passed through the optical system, it goes through the sound reproducing device. Both of these portions of the machine are so synchronized together that the film is fed through the system at a constant velocity.

The standard moving picture film is provided with holes near the periphery of the film in which the various sprocket wheels engage. These sprocket wheels all move at such a rate that the film is fed uniformly and constantly, except of course for that section in which the projection of the picture takes place.

In the printing of the sound track on the film, this is usually set ahead or advanced over the corresponding pictures since in standard practice the reproduction of the sound takes place on the film after the picture has been projected so that in the manufacture of the film in order to synchronize the voice and the action, the sound track is usually advanced ahead of the picture itself. The sound track is usually sufficiently far advanced over the picture itself so that a certain amount of slack may be provided in the film between the points of projection of the film on the screen and the point of reproduction of the sound from the film.

In various types of machines it will be appreciated that there is some times greater or less distance between the picture projection and the sound reproduction positions so that the sound track must be sufficiently advanced over the picture to allow the film to be used easily with most types of projectors. This slack is usually provided for at a point just after the film has left the sprocket wheel following the Geneva movement and in the usual course between this sprocket wheel and a sprocket wheel at the lower end of the projecting device. From this point the film is fed through the acoustic head or box where the sound is reproduced.

In the construction of the type that is described above, considerable vibration is imparted to the film from the action of the sprocket wheel upon the film as each sprocket pin pulls the film along. This vibration is of various types and through the medium of the film itself is carried into the sound head in such a way that the effect of noise or extraneous sounds is given to the voices or sound reproductions that is of course foreign to the original recording of the sound waves. Such noise is particularly noticeable where great amplification is desired and often acts to limit the amount of useful amplification of the sound that may be provided. This motion is due not only to the action of the sprocket wheels just after the Geneva movement, but also to the action of the sprocket wheels which may be provided in the sound head before the sound reproducing system.

In the present invention the applicant provides an arrangement of the film feed between the projection head and the sound head so that this extraneous vibration and interference with proper sound reproduction is avoided and truer reproduction of the sound with greater amplification is possible.

The invention will be more fully described in connection with the specification below and the drawing which illustrates the invention as applied to a sound and picture projecting device.

In the drawing—

Figure 1 shows a section through a projector and sound head of the ordinary type in which the present invention is applied.

Figure 2 shows a detail of an element shown in Figure 1.

Figure 3 shows an end view looking at the right of Figure 2, and,

Figure 4 shows a modification of the device shown in Figure 2.

In Figure 1 the upper portion of the figure, 1 indicates the picture projection head, while the lower portion 2 indicates the sound reproducing head. In the upper head 1 the film 3 after passing by the projection shutter is usually fed by means of a sprocket wheel 4 to the sound head 2. In most projection heads after the sprocket wheel 4 there is provided another set of rollers and sprocket wheels and between this last sprocket wheel and the sprocket wheel 4, the slack in the film to account for the advance of the sound over the picture is taken up. In the present system however, a set of two rollers is provided in the lower portion of the projection head. These rollers comprise rollers 5 and 6. The roller 5 is mounted on the frame 7 of the projection head in any suitable manner in such a way that it, the roller 5, may be freely rotated on the bearing element 8. The second roller 6 is mounted to move on a shaft 9 which is supported by means of a lever 10 which is pivoted to the frame 7 in the pivot 11. The details of this construction is indicated in Figures 2 and 3. The shaft 8 of the lower roller 5 may carry a fly-wheel 12 indicated in Figure 2 on the left end of the shaft. The upper roller 6 mounted on the shaft 9 may carry a knurled cap nut 13 which is provided with a collar 14 to hold the roller 6 upon the shaft 9. The shaft 9 may be pinned to the arm 10 or the shaft may be simply forced into a recess in the arm 10. The lower roller 5 is provided with a flat surface portion 15 at the end of which are shoulders 16 and 61 beyond which are the flange elements 18 and 19. The film itself rests upon the shoulders 16 and 61 which shoulders are positioned on the periphery of the film beyond the point of contact of the sound track. Aligned with the shoulders 16 and 61 are the shoulders or flanges 20 and 21 of the roller 6. These shoulders 20 and 21 rest respectively upon the shoulders 16 and 61 and hold the film by the weight of the roller 6 against the shoulders 16 and 61 of the roller 5. The weight of the roller 6 pivoted at the point 11 provides in the shoulder bearing elements 20 and 21, sufficient pressure against the film so that the friction between the film and the rollers 5 and 6 cause the rollers to rotate as the film 3 passes through them. The lower roller 5 as indicated in Figure 2 is provided with a fly-wheel 12 so that any tendency of minor changes in velocity of the film due to the sprocket teeth themselves are smoothed out by the position of the flywheel 12 in the system. The roller 5 as indicated in Figure 2 is rigidly positioned on the shaft 8 by means of the machine screw 22 which is set down through the roller 5 into the wall of the shaft 8.

In Figure 4 an arrangement quite similar to that in Figure 2 is shown, with the exception that the fly-wheel 23 is mounted at the right of the lower roller 5 while the upper roller 6 is supported through the lever arm 10 at the left pivoted similarly as that indicated in Figure 2.

The pressure on the edge of the film beyond the edge where the sound track comes, not only acts as sufficient damping means to prevent vibrations of the film as the film enters through the passage 24 into the sound head 2 below, but also provides a means of preventing wear on the film due to the differential action of the sprocket wheels usually positioned in the lower part of the projection head. The film, after passing through the passage 24 in Figure 1, passes over the roller 25 and before the photo-cell 26 from whence it is fed down to the sprocket wheel 27 which acts to draw the film out of the system. Not only do the sprocket wheels in the positions described produce greater wear on the film, but it will be noted that the sprocket wheels provide a considerable eccentric action on the film itself, affecting the reproduction of the sound and usually damaging the sprocket holes at the edge of the film. This is particularly true in positions where slack in the film is provided, since at these points the forward motion of the film is produced only by the rotation of the sprocket wheel itself.

It will be noted that the present invention may be incorporated in most of the standard motion picture projectors such as Simplex, Powers and Motiograph projectors.

Having now described my invention, I claim:

1. In a sound motion picture projecting device in which a film having a projection picture and synchronized sound tracks at the edges thereof pass first through the projection head and then through the sound head, means positioned between the picture projection head and the sound reproduction head comprising a plurality of rollers between which the film is made to pass, said rollers having means bearing upon the edge of the film beyond the sound track for preventing vibration of the film at that point in the system.

2. In a motion picture sound producing device adapted to be operated by a film with a sound track at the margin thereof, means providing a damping of vibrations of said film between the point where the film is projected on the screen and the point where the sound is reproduced comprising a roller having a fixed position over which said film rides and a second roller holding the edges of the film to said first roller by the pressure of its own weight.

3. In a system of the type described a means for preventing wear of the picture film and undesired vibrations, comprising a plurality of rollers, means mounting one roller in a fixed position and free to rotate, said roller having projecting shoulders at either end upon which said film rides and a second roller having a flange bearing on the shoulder of said first roller, said second roller having means holding it in contact with said first roller.

4. In a system of the type described, a plurality of rollers, means mounting the lower of said rollers in a fixed position and free to rotate, said roller having an outwardly extending shoulder from the inner surface thereof with a flange extending at the side of said roller, a second roller having a flange positioned to bear on the shoulders of the first roller, a lever arm supporting said roller and means pivoting said lever arm in position to allow said rollers to come in contact with one another upon the flange and shoulder surfaces respectively.

5. In a system of the type described, a plurality of rollers, means mounting one of said rollers in a fixed position, means mounting the other of said rollers in a moveable position, said means permitting said rollers to bear together along their peripheral edges only, a fly-wheel attached to one of said rollers the means mounting the roller in a movable position having pivoted means and by its weight keeping the bearing surface in contact with each other.

6. In a sound motion picture projecting device in which a film having a projection picture and synchronized sound track at the edge thereof passes first through the projection head and then through the sound head, means positioned directly before the sound head entrance comprising a pair of rollers, means mounting one of said rollers on a spindle to permit free rotation thereof, means mounting the other of said rollers to bear by gravity on the first roller and be free to rotate, said means comprising a spindle on which said roller is mounted, a lever arm supporting said spindle at one end and means pivoting the other end of said spindle to the frame of the projection head, the upper of said rollers having a flange at its periphery and the lower of said rollers having a shoulder positioned to coact with said flange, both said shoulder and said flange being on the film beyond the sound track.

7. In a sound motion picture projecting device in which a film having a projection picture and synchronized sound track at the edge thereof passes first through the projection head and then through the sound head, means positioned directly before the sound head entrance comprising a pair of rollers, means mounting one of said rollers on a spindle to permit free rotation thereof, means mounting the other of said rollers to bear by gravity on the first roller and be free to rotate, said means comprising a spindle on which said roller is mounted, a lever arm supporting said spindle at one end and means pivoting the other end of said spindle to the frame of the projection head, the upper of said rollers having a flange at its periphery and the lower of said rollers having a shoulder positioned to coact with said flange, both said shoulder and said flange being on the film beyond the sound track, said second roller having its center in a position vertically beyond the vertical line through the center of said first roller.

PIERINO EDWARD COMI.